United States Patent
Hashimoto et al.

(10) Patent No.: US 9,858,003 B2
(45) Date of Patent: Jan. 2, 2018

(54) STORAGE SYSTEM THAT RELIABLY STORES LOWER PAGE DATA

(71) Applicant: TOSHIBA MEMORY CORPORATION, Tokyo (JP)

(72) Inventors: Daisuke Hashimoto, Cupertino, CA (US); Takumi Abe, Kanagawa Yokohama (JP)

(73) Assignee: TOSHIBA MEMORY CORPORATION, Tokyo (JP)

(*) Notice: Subject to any disclaimer, the term of this patent is extended or adjusted under 35 U.S.C. 154(b) by 0 days.

(21) Appl. No.: 15/253,740

(22) Filed: Aug. 31, 2016

(65) Prior Publication Data

US 2017/0315741 A1 Nov. 2, 2017

Related U.S. Application Data

(60) Provisional application No. 62/330,429, filed on May 2, 2016.

(51) Int. Cl.
*G11C 7/10* (2006.01)
*G06F 3/06* (2006.01)

(52) U.S. Cl.
CPC .......... *G06F 3/0619* (2013.01); *G06F 3/064* (2013.01); *G06F 3/0656* (2013.01); *G06F 3/0659* (2013.01); *G06F 3/0665* (2013.01); *G06F 3/0679* (2013.01)

(58) Field of Classification Search
CPC .... G06F 3/0619; G06F 3/0679; G06F 3/0665; G06F 3/0656; G06F 3/064; G06F 3/0659; G11C 7/1063
See application file for complete search history.

(56) References Cited

U.S. PATENT DOCUMENTS

| 7,721,049 B2* | 5/2010 | Ehrlich | G06F 12/0804 |
| | | | 711/113 |
| 8,032,724 B1 | 10/2011 | Smith | |
| 8,041,878 B2 | 10/2011 | Lee | |
| 8,301,832 B1 | 10/2012 | Moore et al. | |
| 8,364,918 B1 | 1/2013 | Smith | |
| 8,370,567 B1 | 2/2013 | Bonwick et al. | |
| 8,539,315 B2 | 9/2013 | Hashimoto | |
| 8,631,191 B2 | 1/2014 | Hashimoto | |
| 8,874,872 B2 | 10/2014 | Feldman et al. | |
| 8,935,302 B2 | 1/2015 | Flynn et al. | |

(Continued)

*Primary Examiner* — Khamdan Alrobaie
(74) *Attorney, Agent, or Firm* — Patterson & Sheridan, LLP

(57) ABSTRACT

A storage system includes a host configured to transmit a write command and store write data in a buffer thereof, and a storage device. The storage device includes a nonvolatile memory including a plurality of blocks, each of the blocks including a plurality of sectors and each of the sectors logically divided into at least a lower page and an upper page for data storage, and a controller configured carry out a write operation to write the write data in the nonvolatile memory in response to the write command, and return a notice to the host acknowledging that the write operation is successful. When a portion of the write data are written in a lower page of a sector of a block and an upper page of the sector remains unwritten after the write operation, the host maintains the portion of the write data in the buffer even after receiving the notice.

10 Claims, 15 Drawing Sheets

(56) References Cited

U.S. PATENT DOCUMENTS

| | | |
|---|---|---|
| 9,026,734 B2 | 5/2015 | Hashimoto |
| 9,026,764 B2 | 5/2015 | Hashimoto |
| 9,274,942 B2 | 3/2016 | Hashimoto |
| 9,330,772 B2 * | 5/2016 | Nagadomi .......... G11C 11/5628 |
| 2003/0163629 A1 * | 8/2003 | Conley .................. G11C 16/10 |
| | | 711/103 |
| 2009/0019194 A1 * | 1/2009 | Toyama ................. G06F 3/061 |
| | | 710/52 |
| 2009/0089490 A1 * | 4/2009 | Ozawa ............... G06F 12/0246 |
| | | 711/103 |
| 2010/0318839 A1 * | 12/2010 | Avila .................. G06F 12/0802 |
| | | 714/5.11 |
| 2014/0215129 A1 | 7/2014 | Kuzmin et al. |
| 2014/0365719 A1 | 12/2014 | Kuzmin et al. |
| 2015/0074371 A1 | 3/2015 | Hashimoto et al. |
| 2015/0331624 A1 | 11/2015 | Law |
| 2015/0347025 A1 | 12/2015 | Law |
| 2016/0011818 A1 | 1/2016 | Hashimoto et al. |
| 2016/0018994 A1 * | 1/2016 | Miyamoto ............ G06F 3/0616 |
| | | 711/103 |
| 2016/0034354 A1 | 2/2016 | Hashimoto et al. |

\* cited by examiner

| MLC (2bit/cell) | | |
|---|---|---|
| Word Line | Lower Page | Upper Page |
| WL-0 | 0 | 2 |
| WL-1 | 1 | 4 |
| WL-2 | 3 | 6 |
| WL-3 | 5 | 8 |
| WL-4 | 7 | 10 |
| WL-5 | 9 | : |
| WL-6 | : | : |
| : | : | : |
| : | : | : |

| TLC (3bit/cell) | | | |
|---|---|---|---|
| Word Line | Lower Page | Middle Page | Upper Page |
| WL-0 | 0 | 2 | 5 |
| WL-1 | 1 | 4 | 8 |
| WL-2 | 3 | 7 | 11 |
| WL-3 | 6 | 10 | 14 |
| WL-4 | 9 | 13 | : |
| WL-5 | 12 | : | : |
| WL-6 | : | : | : |
| : | : | : | : |
| : | : | : | : |

| MLC (2bit/cell) | | |
|---|---|---|
| Word Line | Lower Page | Upper Page |
| WL-0 | 0 | 2 |
| WL-1 | 1 | 4 |
| WL-2 | 3 | 6 |
| WL-3 | 5 | 8 |
| WL-4 | 7 | 10 |
| WL-5 | 9 | : |
| WL-6 | : | : |
| : | : | : |
| : | : | : |

Data Written by Previous Data Writing
Data Successfully Written by Current Data Writing
Data Unsuccessfully Written by Current Data Writing
Unwritten State

STORAGE SYSTEM THAT RELIABLY STORES LOWER PAGE DATA

CROSS-REFERENCE TO RELATED APPLICATION

This application is based upon and claims the benefit of priority from Provisional Application No. 62/330,429, filed May 2, 2016, the entire contents of which are incorporated herein by reference.

FIELD

The present disclosure generally relates to a storage system including a host and a storage device, in particular, a storage system that reliably stores lower page data.

BACKGROUND

A storage system usually includes a host and a storage device, such as a nonvolatile memory device. The storage device writes data upon receiving a write command from the host. The storage device typically includes a plurality of physical blocks for storing data, and each of the physical blocks includes a plurality of memory cells grouped by physical sector. Memory cells of one type can store data of multiple bits. For example, a memory of a multi-level-cell (MLC) type can store data of two bits, and a memory of a triple-level-cell (TLC) type can store data of three bits. When a write operation is carried out in the storage device having memory cells of the MLC type, data are written as lower bits of memory cells in a physical sector, which is referred to as a lower page program, and thereafter other data are written as upper bits of the memory cells, which is referred to as an upper page program.

In some occasions, a program error may occur during the upper page program.

If such a program error occurs during the upper page program, data of lower bits written through the lower page program may become unreadable or lost.

DETAILED DESCRIPTION

According to an embodiment, a storage system includes a host configured to transmit a write command and store write data in a buffer thereof, and a storage device. The storage device includes a nonvolatile memory including a plurality of blocks, each of the blocks including a plurality of sectors and each of the sectors being logically divided into at least a lower page and an upper page for data storage, and a controller configured carry out a write operation to write the write data in the nonvolatile memory in response to the write command, and return a notice to the host acknowledging that the write operation is successful. When a portion of the write data are written in a lower page of a sector of a block and an upper page of the sector remains unwritten after the write operation, the host maintains that portion of the write data in the buffer even after receiving the notice.

According to another embodiment, a storage system includes a host and a storage device. The storage device includes a nonvolatile memory including a plurality of blocks, each of the blocks including a plurality of sectors and each of the sectors being logically divided into at least a lower page and an upper page for data storage, and a controller configured carry out an operation to write data in the nonvolatile memory in response to a command from the host. When the operation to write a portion of the data in a page of a sector in a block is unsuccessful, the controller transfers valid data in the block to another block.

According to still another embodiment, a storage system includes a host, and a storage device. The storage device includes a nonvolatile memory including a plurality of blocks, each of the blocks including a plurality of sectors and each of the sectors logically divided into at least a lower page and an upper page for data storage, and a controller configured to transfer valid data in a target block to another block and to invalidate the valid data in the target block only upon all upper pages of sectors to which the valid data are transferred becoming a written state in said another block.

Details of the present disclosure are described below with reference to the drawings.

[Storage System]

Figure 1:
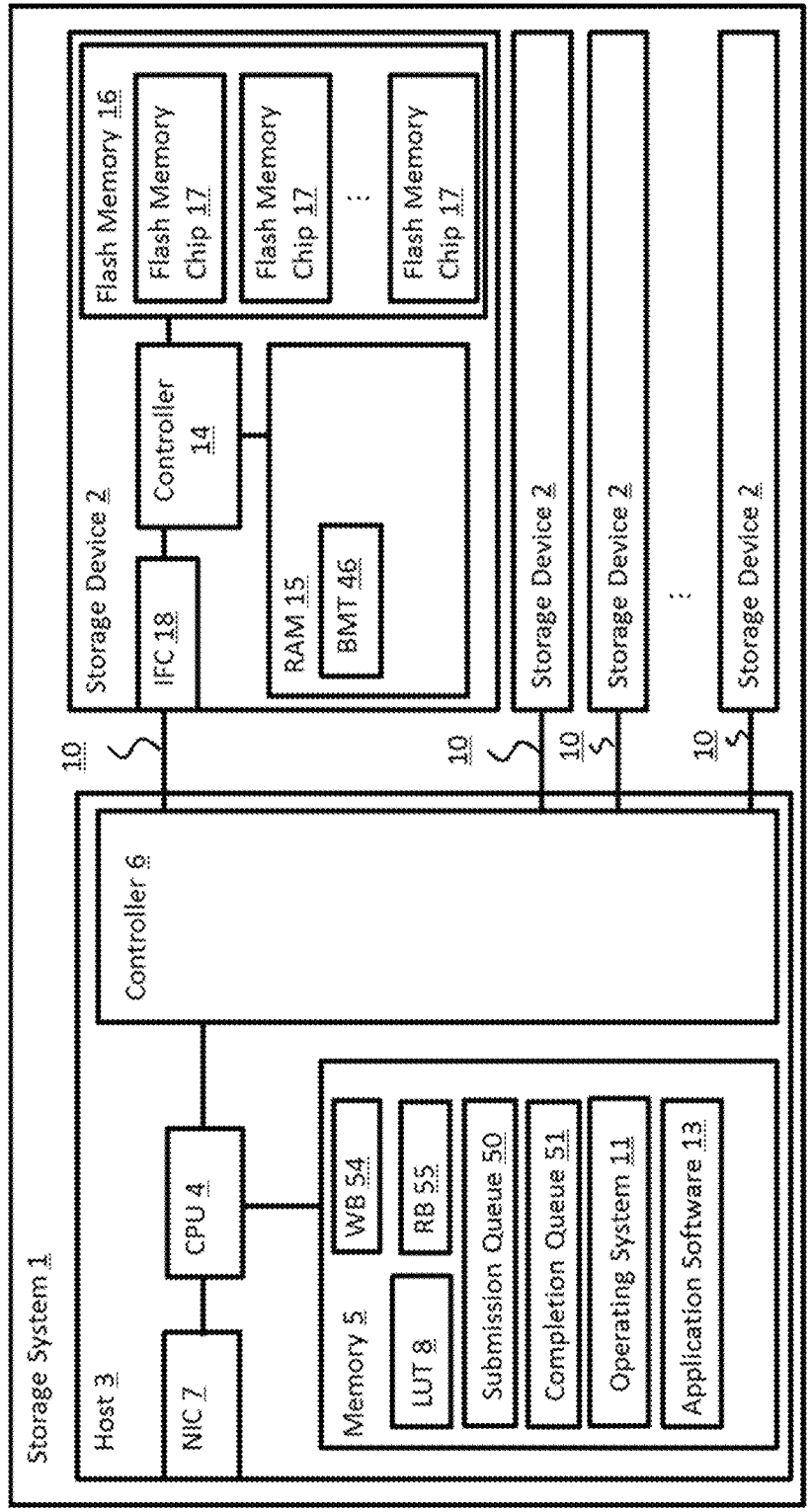
FIG. 1 illustrates a configuration of a storage system, which includes a host and at least a storage device, according to an embodiment.
Figure 2:
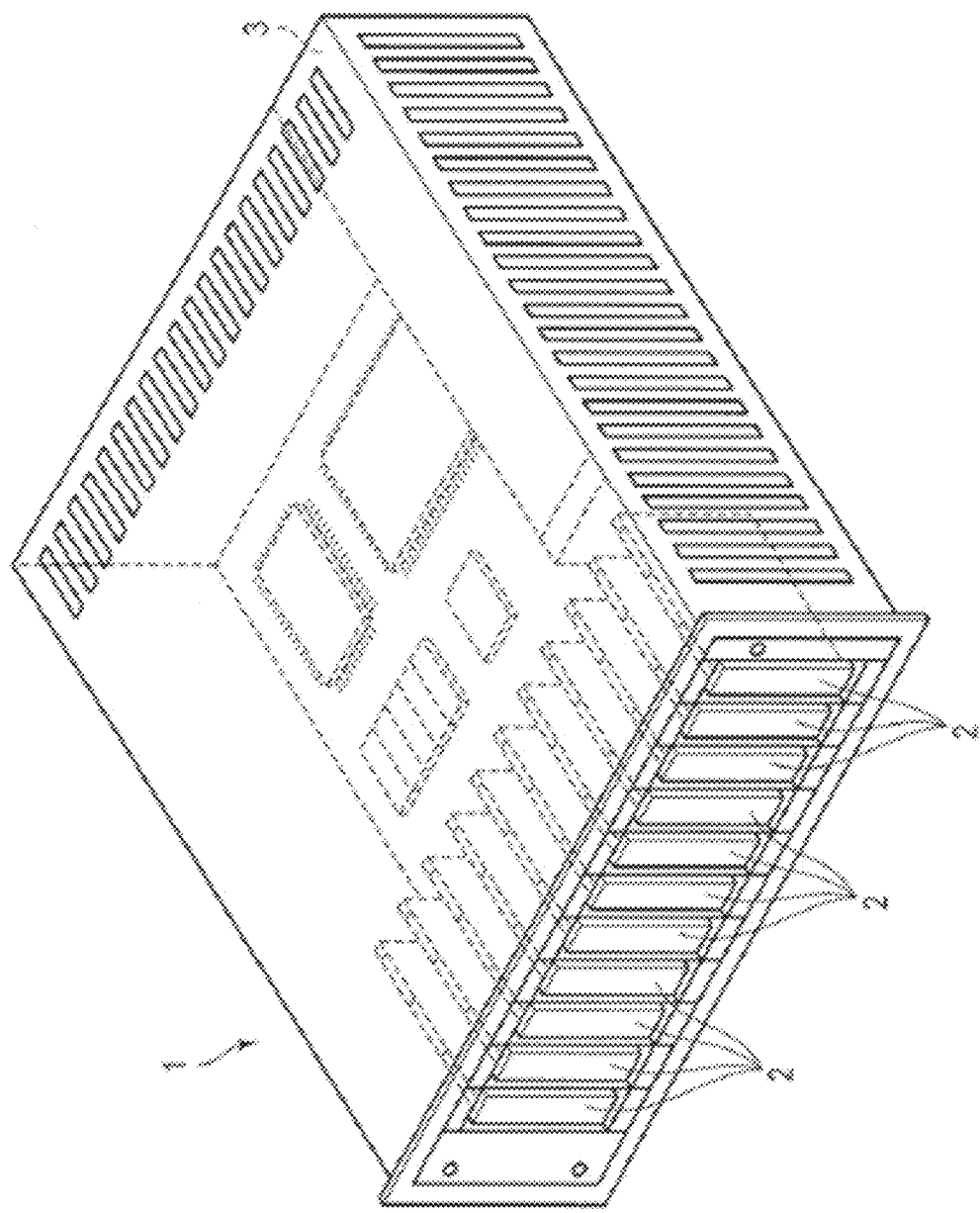
FIG. 2 illustrates a physical configuration of the storage system according to the embodiment.

FIG. 1 illustrates a configuration of a storage system 1 according to an embodiment. The storage system 1 includes a host 3, one or more storage devices 2, and an interface 10 that connects the host 3 and each of the storage devices 2. In the present embodiment, the storage system 1 is a 2 U storage appliance shown in FIG. 2. That is, the host 3 and the one or more storage devices 2 are enclosed in a housing having a size of the 2 U rackmount appliance platform. Each of the storage devices 2 is a nonvolatile storage device having a 2.5 inch form factor, 3.5 inch form factor, M.2 form factor or an Add-In Card (AIC) form factor. Further, in the present embodiment, the interface 10 employs PCI Express (Peripheral Component Interconnect Express, PCIe) interface. Alternatively, the interface 10 can employ any other technically feasible protocol, such as SAS (Serial Attached SCSI) protocol, USB (Universal Serial Bus), SATA (Serial Advanced Technology Attachment), Thunderbolt®, Ethernet®, Fibre channel, and the like.

The storage device 2 includes a controller 14, a random access memory (RAM) 15, a nonvolatile semiconductor memory, such as a NAND flash memory 16 (hereinafter flash memory 16), and an interface controller (IFC) 18. The IFC 18 is configured to perform transmission and reception of signals to and from the host 3 via the interface 10. The controller 14 is configured to manage and control the flash memory 16, the RAM 15, and the IFC 18.

The RAM 15 is, for example, a volatile RAM, such as a DRAM (Dynamic Random Access Memory) and a SRAM (Static Random Access Memory), or a nonvolatile RAM, such as a FeRAM (Ferroelectric Random Access Memory), an MRAM (Magnetoresistive Random Access Memory), a PRAM (Phase Change Random Access Memory), and a ReRAM (Resistance Random Access Memory). The RAM 15 may be embedded in the controller 14.

The flash memory 16 includes one or more flash memory chips 17 and stores user data designated by the host 3 in one or more of the flash memory chips 17. The controller 14 and the flash memory 16 are connected via a flash memory interface 21 (See FIG. 4), such as Toggle and ONFI.

The host 3 includes a CPU 4, a memory 5, a controller 6, and a network interface controller (NIC) 7. The CPU (central processing unit) 4 is a central processing unit in the host 3, and performs various calculations and control operations of the host 3. The CPU 4 and the controller 6 are connected through an interface using a protocol such as PCI Express. The CPU 4 performs control of the storage device 2 via the controller 6. The controller 6 is a PCIe Switch and a PCIe expander in the present embodiment, but, a SAS expander, a RAID controller, a JBOD controller, a JBOF controller, and the like may be used as the controller 6.

The CPU 4 also performs control of the memory 5. The memory 5 is, for example, a DRAM (Dynamic Random Access Memory), a MRAM (Magnetoresistive Random Access Memory), a ReRAM (Resistance Random Access Memory), and a FeRAM (Ferroelectric Random Access Memory).

The CPU 4 is a processor configured to control the operation of the host 3. The CPU 4 executes, for example, an operating system (OS) 11 loaded from one of the storage devices 2 to the memory 5. The CPU 4 is connected to the NIC 7, which is connected to an external network via a network interface. The network interface employs a protocol, for example, an Ethernet, InfiniBand, Fibre Channel, PCI Express Fabric, WiFi, and the like.

The memory 5 temporarily stores programs and data and functions as a working memory of the CPU 4. The memory 5 includes memory regions for storing the operating system (OS) 11, application software 13, a look-up table (LUT) 8, a submission queue 50, and a completion queue 51, and also includes a write buffer (WB) 54 and a read buffer (RB) 55. As is generally known, the OS 11 represents system software for managing the host 3, and may be a commodity OS such as Linux®, Windows®, or a virtualization software available from VMware, Inc. The OS 11 manages inputs and outputs to and from the host 3, the storage devices 2, and the memory 5. That is, the OS 11 enables software to use components in the storage system 1, including the storage devices 2. The OS 11 is used to control a manner of data writing to the storage devices 2 and data reading from the storage devices 2.

The write buffer (WB) 54 temporarily stores data to be written into the storage devices 2, i.e., write data. Further, according to the present embodiment, the WB 54 maintains the data without erasing even after the data have been written in to the storage devices 2 in some cases. More specifically, the WB 54 maintains the stored data if the data have been written in a lower page of a block in a flash memory 16 and no data have been successfully written in a corresponding upper page of the block. Then, after data have been successfully written in the corresponding upper page, the data of the lower page and the data of the corresponding upper page are erased from the WB 54. The detailed data management of the WB 54 will be described below.

The read buffer (RB) 55 temporarily stores data read from the storage devices 2, i.e., read data. The LUT 8 is used to manage mapping between file IDs or object IDs of data and physical addresses of a flash memory 16 and the write buffer memory 54 in which the data are temporarily stored for writes or to be stored for reads. In an embodiment, the physical address is notified from the storage devices 2 when corresponding data have been written therein, and the mapping is recorded in the LUT 8 based on the notification from the storage devices 2. That is, the storage devices 2 determine the physical address to which the corresponding data are to be written. Alternatively, in another embodiment, the physical address is determined by the host 3 when corresponding data are written therein, and the mapping is recorded in the LUT 8 based on the determined physical addresses.

The submission queue 50 maintains, for example, commands and requests with respect to the storage devices 2. The completion queue 51 maintains information indicating completion of the commands and requests (such as a write completion notification, a copy completion notification, a read completion notification, an invalidate completion notification, and a bad block remapping notification), and information related to the completion (such as an upper page write flag), which are sent to the host 3 upon completion of the commands and requests by the storage devices 2.

The host 3 sends, to the storage device 2 via the interface 10, a number of commands for data writing to and data reading from the storage devices 2. The commands include a read command, a write command, an invalidate command, a copy command, and the like, as described below in detail.

Figure 3:
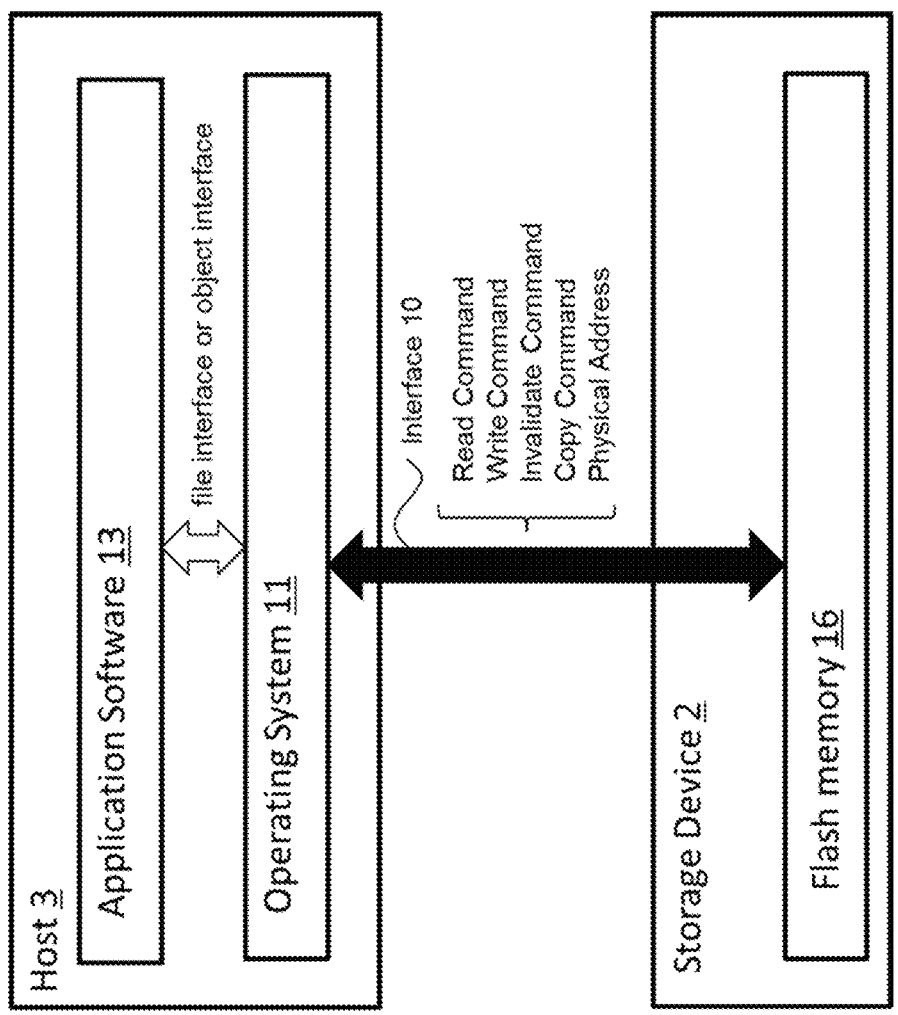
FIG. 3 illustrates a software layer structure of the host and communication architecture between the host and a storage device according to the embodiment.

In the memory 5, one or more units of the application software 13 are loaded, respectively. FIG. 3 illustrates a software layer structure of the host 3 and communication architecture between the host 3 and the storage device 2 according to the present embodiment. Usually, the application software 13 loaded in the memory 5 does not directly communicate with the storage device 2, and instead communicates with the storage device 2 through the OS 11 loaded in the memory 5 via a file interface and an object interface.

The OS 11 transmits commands including the read command, the write command, the invalidate command, and the copy command, and a physical address, to the storage devices 2 via the interface 10. The physical address is used to designate a physical location of the flash memory 16 to be accessed for data reading and data copying, and also for data writing if the host 3 can determine (designate) a physical location for data writing.

The application software 13 includes, for example, client software, database software (e.g., Cassandra DB, Mongo DB, RocksDB, HBASE, and etc.), Distributed Storage System (Ceph etc.), Virtual Machine (VM), guest OS, and Analytics Software (e.g., Hadoop, R, and etc.).

[Flash Memory Chip]

Figure 4:
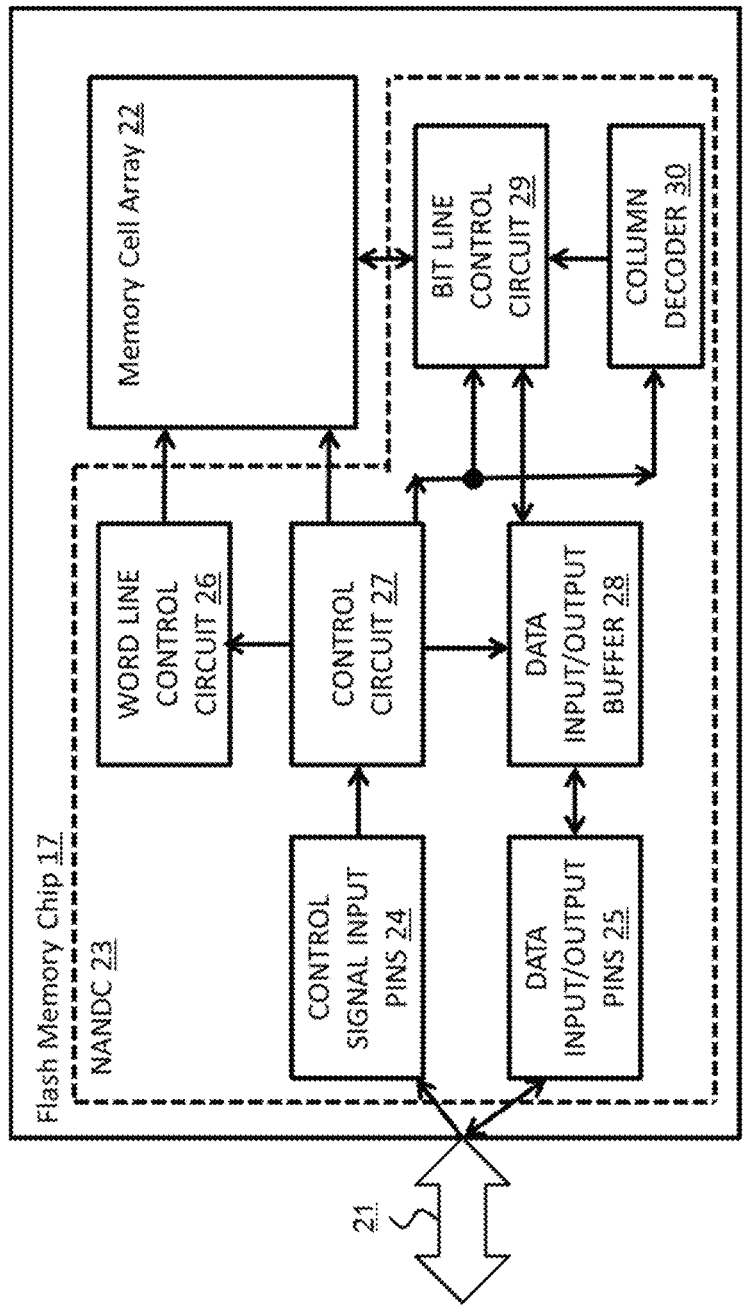
FIG. 4 illustrates a configuration of a flash memory chip in a storage device.

FIG. 4 illustrates a configuration of the flash memory chip 17. The flash memory chip 17 includes a memory cell array 22 and a NAND controller (NANDC) 23. The memory cell array 22 includes a plurality of memory cells arranged in a matrix configuration, each of which stores data, as described below in detail. The NANDC 23 is a controller configured to control access to the memory cell array 22. Specifically, the NANDC 23 includes control signal input pins 24, data input/output pins 25, a word line control circuit 26, a control circuit 27, a data input/output buffer 28, a bit line control circuit 29, and a column decoder 30. The control circuit 27 is connected to the control signal input pins 24, the word line control circuit 26, the data input/output buffer 28, the bit line control circuit 29, and the column decoder 30, and controls the entire operations of the circuit components of the NANDC 23. Also, the memory cell array 22 is connected to the word line control circuit 26 and the control circuit 27. Further, the control signal input pins 24 and the data input/output pins 25 are connected to the controller 14 of the storage device 2, through the flash interface 21.

When data are read from the flash memory chip 17, data in the memory cell array 22 are output to the bit line control circuit 29 and then temporarily stored in the data input/output buffer 28. Then, the read data are transferred to the controller 14 of the storage device 2 from the data input/output pins 25 through the flash interface 21. When data are written into the flash memory chip 17, data to be written (write data) are input to the data input/output buffer 28 through the data input/output pins 25. Then, the write data are transferred to the column decoder 30 through the control circuit 27, and input to the bit line control circuit 29 by the column decoder 30. The write data are written into memory cells of the memory cell array 22 at a timing controlled by the word line control circuit 26 and the bit line control circuit 29. When control signals are input to the flash memory chip 17 from the controller 14 of the storage device 2 through the flash interface 21, the control signals are input through the control signal input pins 24 into the control circuit 27. Then, the control circuit 27 generates control signals, according to the control signals from the controller 14, and controls voltages for controlling memory cell array 22, bit line control circuit 29, column decoder 30, data input/output buffer 28, and word line control circuit 26. Here, a circuit section that includes the circuits other than the memory cell array 22 in the flash memory chip 17 is referred to as the NANDC 23.

Figure 5:
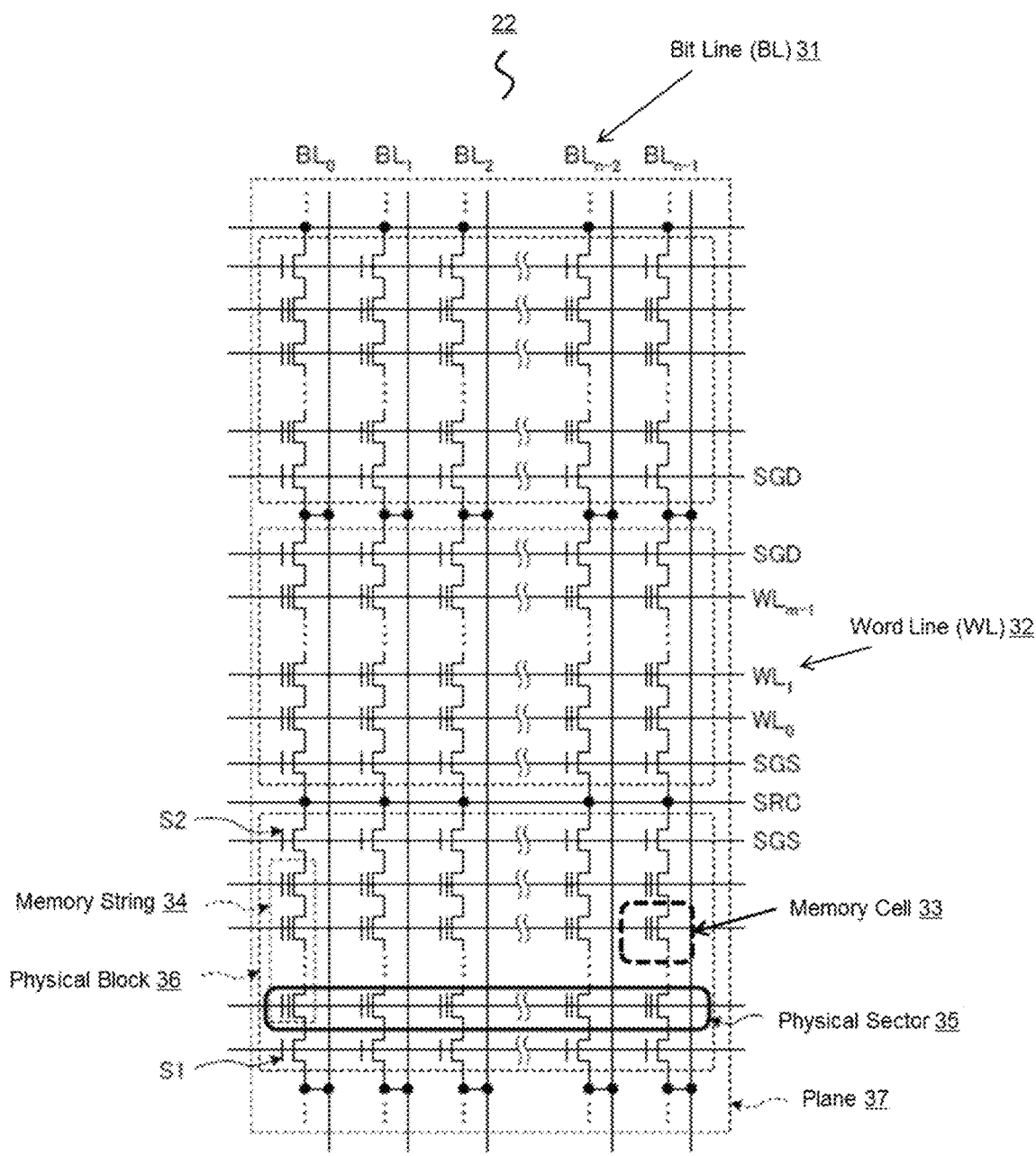
FIG. 5 illustrates a detailed circuit structure of a memory cell array in the flash memory chip.

FIG. 5 illustrates a detailed circuit structure of the memory cell array 22. The memory cell array 22 includes one or more planes 37 (only one of which is depicted in FIG. 5). Each plane 37 includes a plurality of physical blocks 36, and each physical block 36 includes a plurality of memory strings 34. Further, each of the memory strings (MSs) 34 includes a plurality of memory cells 33.

The memory cell array 22 further includes a plurality of bit lines 31, a plurality of word lines 32, and a common source line. The memory cells 33, which are electrically data-rewritable, are arranged in a matrix configuration at intersections of bit lines 31 and the word lines. The bit line control circuit 29 is connected to the bit lines 31 and the word line control circuit 26 is connected to the controlling word lines 32, so as to control data writing and reading with respect to the memory cells 33. That is, the bit line control circuit 29 reads data stored in the memory cells 33 via the bit lines 31 and applies a write control voltage to the memory cells 33 via the bit lines 31 and writes data in the memory cells 33 selected by the word line 32.

In each memory string (MS) 34, the memory cells 33 are connected in series, and selection gates S1 and S2 are connected to both ends of the MS 34. The selection gate S1 is connected to a bit line BL 31 and the selection gate S2 is connected to a source line SRC. Control gates of the memory cells 33 arranged in the same row are connected in common to one of word lines 32 WL0 to WLm−1. First selection gates S1 are connected in common to a select line SGD, and second selection gates S2 are connected in common to a select line SGS.

A plurality of memory cells 33 connected to one word line 32 configures one physical sector 35. In the one physical sector 35, data equivalent to two physical pages (two pages) are stored when 2 bits/cell write system (MLC, four-level) is employed, and data equivalent to one physical page (one page) are stored when 1 bit/cell write system (SLC, two-level) is employed. Further, when 3 bits/cell write system (TLC, eight-level) is employed, data equivalent to three physical pages (three pages) are stored in the one physical sector 35. Alternatively, 4 or more bits/cell write system may be employed. In the flash memory 16, data are written in units of one page, and data are erased in units of one physical block 36.

During a write operation (also referred to as a program operation), a read operation, and a program verify operation, one word line WL is selected according to a physical address, such as a row address, received from the controller 14, and, as a result, one physical sector 35 is selected. Switching of a page in the selected physical sector 35 is performed according to a physical page address in the physical address. In the present embodiment, the flash memory 16 employs the 2 bit/cell write method, and the controller 14 controls the physical sector 35, recognizing that two pages, i.e., an upper page and a lower page, are included in the physical sector 35, as physical pages. A physical address comprises a physical block address and a physical page address. A physical block address is assigned to each of the physical blocks 36, and a physical page address is assigned to each of the physical pages.

Figure 6:
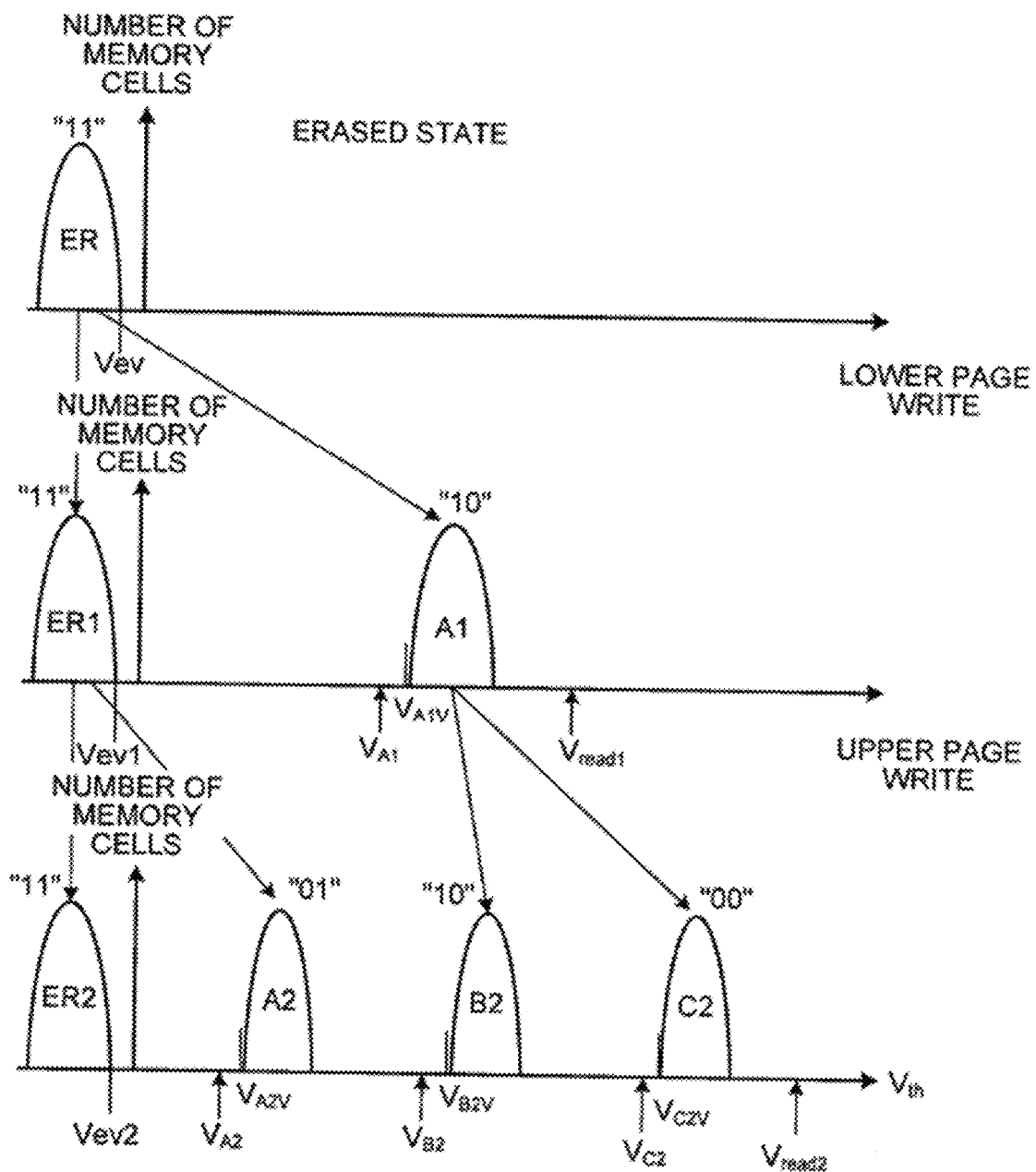
FIG. 6 illustrates a relation between 2-bit four-level data (data "11", "01", "10", and "00") stored in a memory cell of a four-level NAND cell type and a threshold voltage distribution of each level.

The four-level NAND memory of 2 bit/cell is configured such that a threshold voltage in one memory cell has four kinds of distributions. FIG. 6 illustrates a relation between 2-bit four-level data (data "11", "01", "10", and "00") stored in a memory cell 33 of a four-level NAND memory cell and a threshold voltage distribution of each level. 2-bit data of one memory cell 33 include lower page data and upper page data. The lower page data and the upper page data are typically written in the memory cell 33 according to separate write operations, i.e., a low page write operation and an upper page write operation, in this order. Here, when data are represented as "XY," "X" represents the upper page data and "Y" represents the lower page data.

Each of the memory cells 33 includes a memory cell transistor, for example, a MOSFET (Metal Oxide Semiconductor Field Effect Transistor) having a stacked gate structure formed on a semiconductor substrate. The stacked gate structure includes a charge storage layer (a floating gate electrode) formed on the semiconductor substrate via a gate insulating film and a control gate electrode formed on the floating gate electrode via an inter-gate insulating film. A threshold voltage of the memory cell transistor changes according to the number of electrons accumulated in the floating gate electrode. The memory cell transistor stores different values of data by varying the threshold voltage thereof.

In the present embodiment, each of the memory cells 33 employs a write system of a four-level store method for 2 bit/cell (MLC), using an upper page and a lower page. Alternatively, the memory cells 33 may employ at least partially a write system of a two-level store method of 1 bit/cell (SLC), using a single page, an eight-level store method for 3 bit/cell (TLC), using an upper page, a middle page, and a lower page, or a multi-level store method for 4 bit/cell (QLC) or more. The memory cell transistor is not limited to the structure including the floating gate electrode and may be a structure such as a MONOS (Metal-Oxide-Nitride-Oxide-Silicon) type that can adjust a threshold voltage by trapping electrons on a nitride interface functioning as a charge storage layer. Similarly, the memory cell transistor of the MONOS type can be configured to store data of a multiple bits. The memory cell transistor can be, as a nonvolatile storage medium, a semiconductor storage medium in which memory cells are three-dimensionally arranged as described in U.S. Pat. No. 8,189,391, United States Patent Application Publication No. 2010/0207195, and United States Patent Application Publication No. 2010/0254191, the entire contents of both applications are incorporated by reference herein.

[Address Structure]

Figure 7:
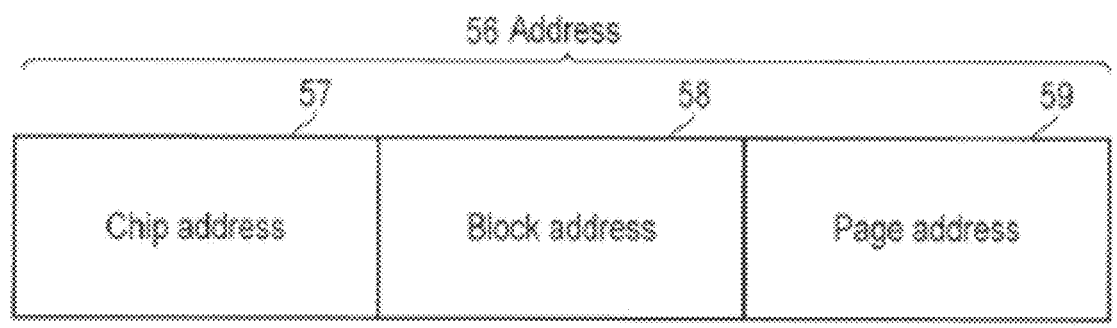
FIG. 7 illustrates an example of an address structure of a physical address according to the embodiment.

FIG. 7 illustrates an example of an address structure of a physical address 56 according to the present embodiment. The physical address 56 is transmitted via the interface 10 as a form of the address structure shown in FIG. 7, when the OS 11 operates according to the procedure of the physical access. The address structure of the physical address 56 includes a chip address 57, a block address 58, and a page address 59. In the present embodiment, the chip address 57 is located at the MSB (most significant bit) side of the address structure, and the page address 59 is located at the LSB (least significant bit) side of the address structure in FIG. 7. However, the locations of the chip address 57, the block address 58, and the page address 59 in the physical address 56 can be varied arbitrarily.

[Block Mapping]

Figure 8:
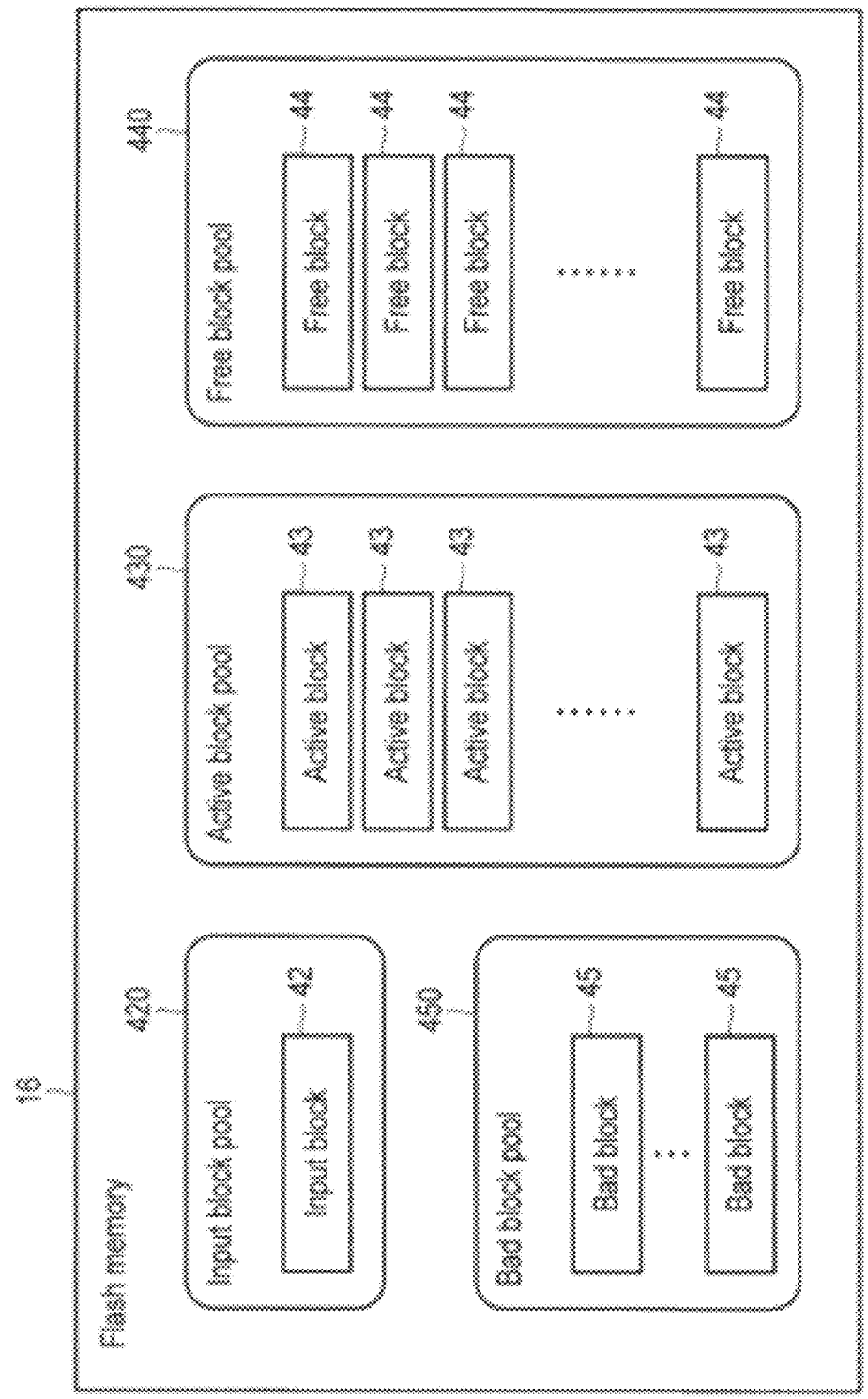
FIG. 8 illustrates an overview of mapping of physical blocks based on block pools in the embodiment.

FIG. 8 illustrates an overview of the mapping of physical blocks based on block pools in the present embodiment. The mapping is managed using a block mapping table (BMT) 46 stored in the RAM 15. The block pools include an input block pool 420, an active block pool 430, a free block pool 440, and a bad block pool 450. The mappings of physical blocks are managed by the controller 14, and when a physical block is remapped into a different block pool, the controller 14 updates the mappings in the BMT 46. The controller 14 maps each of the physical blocks of the flash memory 16 to one of the block pools, in the BMT 46.

The input block pool 420 includes at least one input block 42. The input block 42 is a block in which data are written. The input block 42 may store no data, or include both a written region and an unwritten region in which data can be written.

The active block pool 430 includes one or more active blocks 43. The active block 43 is a physical block that no longer has a writable region (i.e., becomes full of data). Also, at least some of the written data in the active block 43 are valid data.

The free block pool 440 includes one or more free blocks 44. The free block 44 includes physical blocks that have not stored any data previously and physical blocks that store no valid data. That is, all data stored in the free block 44, if any, have been invalidated.

The bad block pool 450 includes one or more bad blocks 45. The bad block 45 is a block that cannot be used for data writing, for example, because of defects.

Figure 9:
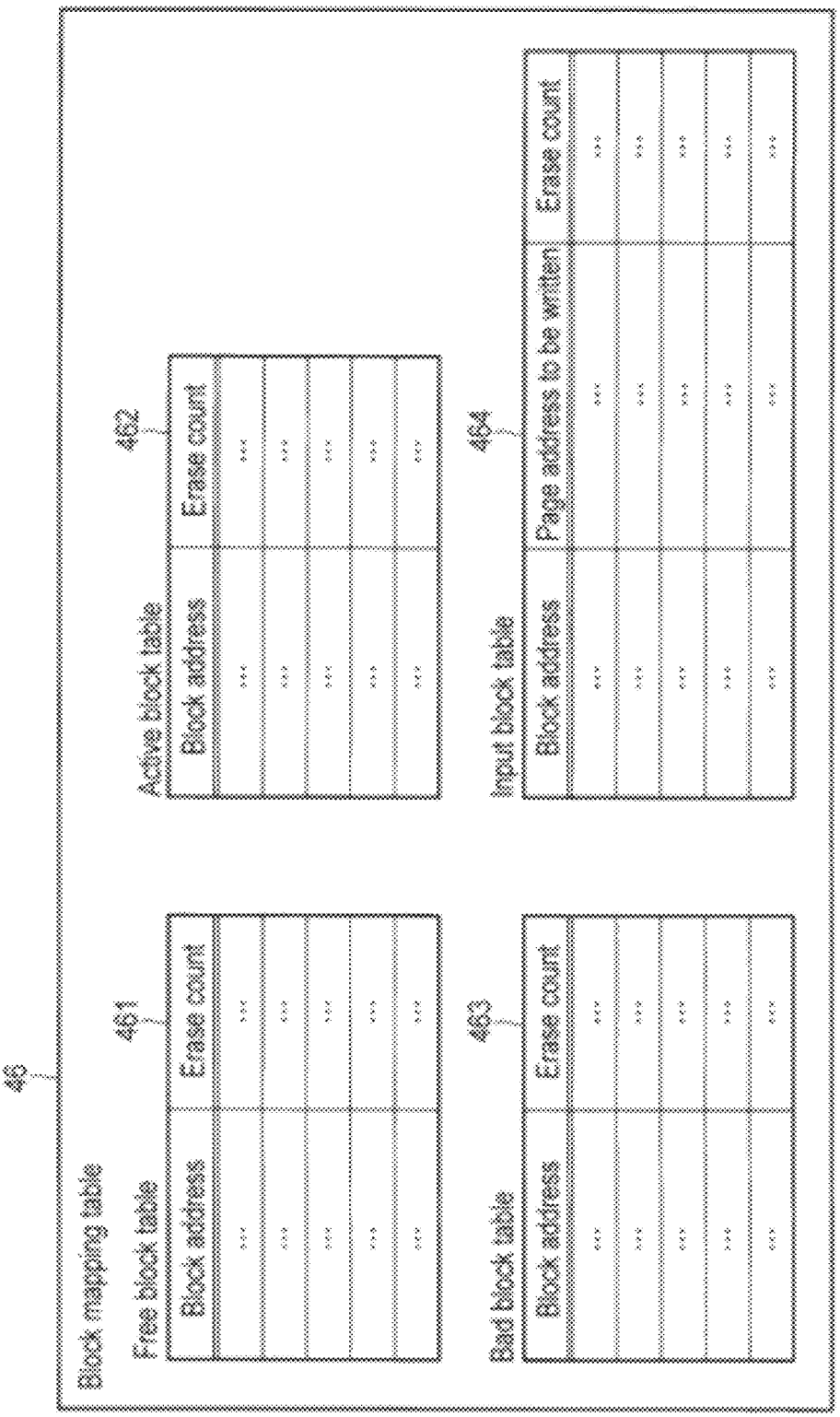
FIG. 9 illustrates an example of a block mapping table (BMT) according to the embodiment.

FIG. 9 illustrates an example of the BMT 46 employed in the storage device according to the present embodiment. The BMT 46 includes a free block table 461, an active block table 462, a bad block table 463, and an input block table 464. In each of the tables 461-464 of the BMT 46, each entry indicates correspondence between a block address and an erase count, which indicates a number of times data in the block address have been erased. Other configurations of different types of block pools may be also managed in the BMT 46.

The input block table 464 also indicates a physical page address (PPA) in which next write data are to be written. When the controller 14 remaps a free block 44 in the free block pool 440 as an input block 42, the controller 14 removes a block address of the free block 44 from the free block table 461, and adds a new entry including the block address and PPA=0 to the input block table 464.

Because bad blocks 45 of the flash memory 16 are managed by the controller 14 using the bad block table 463 in the BMT 46 in the present embodiment, the CPU 4 of the host 3 does not have to manage the bad blocks 45 and does not have to monitor unreliable physical blocks and defects of the flash memory 16. If a physical block is determined to be unreliable by the controller 14 of the storage device 2, the controller 14 prevent data from being written into the physical block by deleting an entry of the corresponding block address from one of the input block table 464, the active block table 462, and the free block table 461 that include the entry and by adding the entry to the bad block table 463. For example, when a program error, an erase error, or an uncorrectable ECC error happens during access to a physical block, the controller 14 determines to remap the physical block as a bad block 45. Because a physical address in which data are to be written is determined by the controller 14, not by the host 3, the host 3 does not need to perform such bad block management.

In addition, because an erase count of each physical block is managed by the controller 14 of the storage device 2 using the BMT 46, the controller 14 may carry out dynamic wear leveling when writing data into the flash memory 16. For example, in the present embodiment, when the controller 14 remaps a free block 44 in the free block pool 440 as an input block 42, the controller 14 selects a free block 44 that has the least erase count. If the free block 44 is located in a channel or a bank that is in a busy state, the controller 14 may select another free block 44 that has the second least erase count and is in an idle state from the free block pool 440.

When the controller 14 processes a write operation with respect to the input block 42, the controller 14 specifies the physical page address (PPA) by referring to the input block table 464, writes data into the physical page address of the input block 42, and increments the PPA in the input block table 464 ((New) PPA=(old) PPA+written data size). When the (new) PPA exceeds maximum page address of the input block 42, the controller 14 remaps the input block 42 as an active block 43 in the active block pool 430.

[Write Operation]

Figure 10:
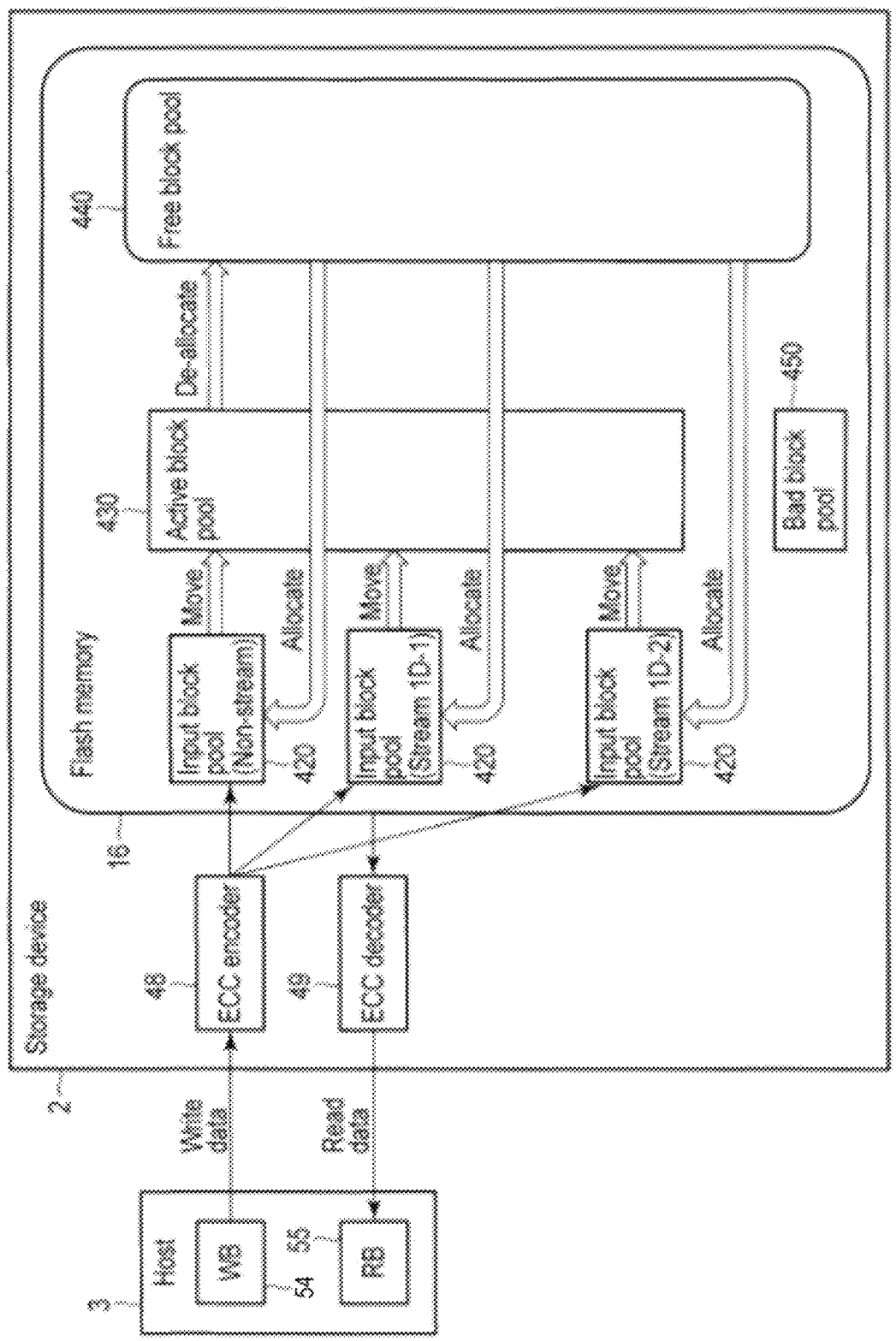
FIG. 10 illustrates an architecture overview of data flow and a block mapping transition in the storage system according to the embodiment.

FIG. 10 schematically illustrates an example of a write operation performed in the storage device 2 according to the present embodiment. During the write operation, the controller 14 writes write data (user data) stored in the write buffer (WB) 55 into the flash memory 16. The controller 14 receives the write data from the WB 55 via the interface 10 and generates an ECC code from the write data using an ECC encoder 48 in the controller 14. Also, the controller 14 decodes read data, which include the user data and the ECC code, using an ECC decoder 49 in the controller 14 during a read operation described below.

When the controller 14 writes the write data buffered in the WB 55 into the flash memory 16, the controller 14 specifies physical addresses of pages in the input block 42 into which the write data are to be written, by referring to the BMT 46. If there is no available input block 42 in the flash memory 16, the controller 14 allocates a new input block 42 by remapping a free block 44 in the free block pool 440.

In addition, if no physical page in the input block 42 is available for data writing without erasing data therein, i.e., becomes full of written data, the controller 14 remaps the block as an active block 43 in the active block pool 430. The controller 14 may also remap (de-allocate) an active block 43 in the active block pool 430 as a free block 44 in the free block pool 440, when all data in the active block 43 are invalidated.

A plurality of input blocks 42 is prepared in a plurality of input block pools 420, each of which is dedicated for data writing with respect to a corresponding stream ID, and write data associated with a stream ID is written into an input block 42 associated therewith. A write command from the host 3 may include a stream ID if data to be written is associated therewith. When the host 3 posts a write command specifying a stream ID to the submission queue 50, the controller 14 receives the write data from the WB 54 and writes the write data into the input block 42 associated with the stream ID. If the host 3 posts a write command which does not specify a stream ID to the submission queue 50, the controller 14 receives the write data from the WB 54 and writes the write data into an input block 42 associated with no stream ID. By storing write data into different input blocks 42 in accordance with the stream ID, the type of data (or lifetime of data) stored in each input block 42 can be made more uniform, and as a result, entire data in a physical block may be deleted without having to partially transfer the data to another physical block when garbage collection operation is performed, i.e., garbage collection operation becomes more efficient.

Figures 11A, 11B, 11C:
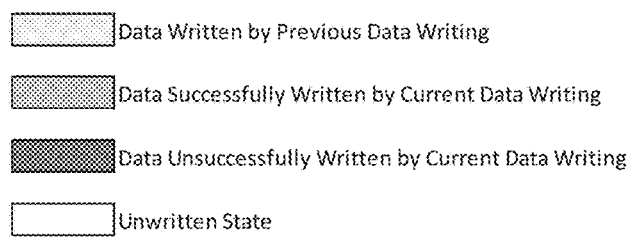
FIG. 11A illustrates an example of an order of data writing in a block through a two bits/cell write method.
FIG. 11B illustrates an example of an order of data writing in a block through a three bits/cell write method.
FIG. 11C illustrates an example of a data write state in the block that employs the two bit/cell write method shown in FIG. 11A.

Further in detail, in the present embodiment, in each of the input block 42, data writing to pages are carried out in the orders shown in FIGS. 11A and 11B. FIG. 11A illustrates an order of data writing in a block that employs the write system of a four-level store method, i.e., a 2 bit/cell (MLC) write method. As shown in FIG. 11A, first, data are written in a lower page of a physical sector (first physical sector) connected to a word line WL-0 (shown as "0"). Then, data are written in a lower page of a physical sector (second physical sector) connected to a word line WL-1, which may be or may not be a word line next to the word line WL-0 (shown as "1"). After the data writing in the lower page of the second physical sector, then data are written in an upper page of the first physical sector connected to the word line WL-0, which has been previously selected before the word line WL-1 (shown as "2"). Then, data are written in a lower page of a physical sector (third physical sector) connected to a word line WL-2, which is selected after the word line WL-1 (shown as "3"). In this way, selection of word lines and data writing in upper and lower pages are carried out in the order of WL-0 (lower), WL-1 (lower), WL-0 (upper), WL-2 (lower), WL-1 (upper), . . . WL-n (lower), WL-n−1 (upper), WL-n+1 (lower), and WL-n (upper).

FIG. 11B illustrates an order of data writing in a block that employs the write system of an eight-level store method, i.e., a 3 bit/cell (TLC) write method. As shown in FIG. 11B, first, data are written in a lower page of a physical sector (first physical sector) connected to a word line WL-0 (shown as "0"). Then, data are written in a lower page of a physical sector (second physical sector) connected to a word line WL-1, which may be or may not be a word line next to the word line WL-0 (shown as "1"). Next, data are written in a middle page of the first physical sector, in an upper page of a physical sector (third physical sector) connected to a word line WL-2, in a middle page of the second physical sector, an upper page of the first physical sector, in the order. In this way, selection of word lines and data writing in upper, middle, and lower pages are carried out in the order of WL-0 (lower), WL-1 (lower), WL-0 (middle), . . . WL-n (lower), WL-n−1 (middle), WL-n−2 (upper), and WL-n+1 (lower).

According to the present embodiment, data buffered for data writing into a lower page (or a middle page) of a physical sector of the flash memory 16 are maintained in the WB 54 until the data or subsequent data are successfully written into an upper page of the same physical sector. This sustained data buffering is carried out because data that have been written in a lower page (and a middle page) may be lost or become unreadable when data writing in an upper page of the same physical sector is not successful.

FIG. 11C illustrates an example of a data write state of a block that employs the 2 bit/cell (MLC) write method to explain the data buffering in the WB 54 of the present embodiment. In FIG. 11C, it is assumed that the data corresponding to "0" through "3" were written in the block during a previous write operation, and the data corresponding to "4" through "9" are written during a current write operation. Further, it is assumed that writing of the data corresponding to "5" through "8" are successful, and wiring of the data corresponding to "4" and "9" are unsuccessful.

In the previous write operation, write data were written in the order of "0" through "4" in physical sectors connected to word lines WL-0 through WL-2. Data corresponding to "0" and "2" in the physical sector connected to the word line WL-0 are erased from the WB 54, because data were successfully written in the upper page thereof. On the other hand, data corresponding to "1" and "3" in the physical sectors connected to the word lines WL-1 and WL-2 are maintained in the WB 54, because no data have been successfully written in the upper pages of those physical sectors.

In the current write operation, since the data corresponding to "6" and "8" are successfully written in physical sectors connected to the word line WL-2 and WL-3, the data corresponding to "3," "5," "6," and "8" are erased from the WB 54. On the other hand, the data corresponding to "7" are maintained in the WB 54, because no data have been successfully written in the upper page of a physical sector connected to the word line WL-4 (corresponding to "10").

As for the unsuccessfully-written data, which correspond to "4" and "9," another write operation is carried out into another physical block. Further, since the data corresponding to "1" in the lower page of the physical sector connected to the word line WL-1 may be lost through writing attempt of the data corresponding to "4," the data corresponding to "1" are retrieved from the WB 53 and written into the physical block.

This data buffering in the WB 54 according to the present embodiment enables more reliable data writing in the flash memory 16, because lower-page data that may be lost through an unsuccessful data writing in the corresponding upper page are maintained in the WB 54. Although the data of the lower page, if any of the bits are lost, may be reconstructed through an error correction based on an erasure coding, simply retrieving the data of the lower page from the WB 54 can be carried out faster.

Figure 12:
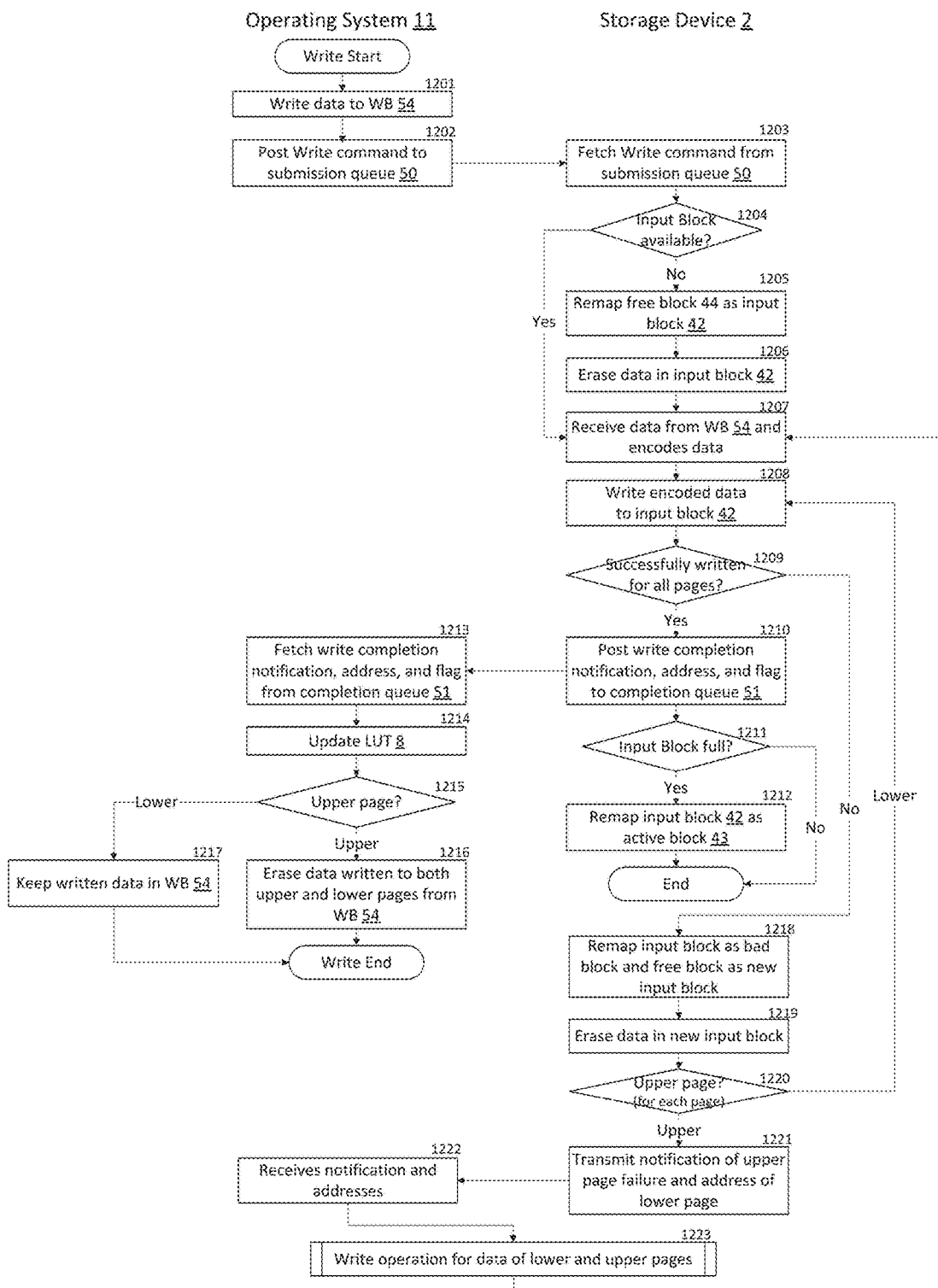
FIG. 12 illustrates a flow of a write operation carried out according to an embodiment.

FIG. 12 is a flow chart illustrating a flow of a write operation carried out in the storage system 1. When the write operation starts, in step 1201, the OS 11 of the host 3 writes data to be written into the flash memory 16 of the storage device 2 (i.e., write data) into the write buffer (WB) 54 of the host 3. Then, in step 1202, the OS 11 posts a write command to the submission queue 50 of the host 3. The write command may include physical addresses address to which write data are to be written or may include no such physical addresses. In the following steps, it is assumed that the write command does not include physical addresses and the controller 14 of the storage device 2 determines the physical addresses in which the write data are to be written. Further, the write command may include a stream ID and a Unique Command Identifier (UCID).

In step 1203, the controller 14 of the storage device 2 fetches the write command from the submission queue 50 and receives the write data from the WB 54. Upon reception of the write data, in step 1204, the controller 14 of the storage device 2 determines whether or not an input block 42 is available for data writing. If the determination is positive (Yes in step 1204), the process proceeds to step 1207. If the determination is negative (No in step 1204), the process proceeds to step 1205. In step 1205, the controller 14 remaps a free block 44 in the free block pool 440 as a new input block 42 for the data writing, by updating the BMT 46. Then, in step 1206, the controller 14 erases data in the new input block 42.

In step 1207, the controller 14 writes the write data in the input block 42. More specifically, the controller 14 determines a physical address of the input block 42 in which the write data are to be written, and the ECC encoder 70 of the controller 14 generates an error correction code based on the write data. Thereafter, the controller 14 writes the write data and the error correction code into the determined physical address of the input block 42 page by page. Here, when the write data are associated with a stream ID, the write data are written into an input block 42 associated with stream ID.

Then, in step 1209, the controller 14 determines whether or not the write data are successfully written into the physical address of the input block 42, that is, whether or not data are written without any program error (write error), for each page. If the determination is positive for all pages (Yes in step 1209), the process proceeds to step 1210. If the determination is negative at least for one page (No in step 1209), the process proceeds to step 1218.

In step 1210, the controller 14 posts a write completion notification, which includes the physical address into which the write data are written and an upper page write flag for each page, in the completion queue 51 of the host 3. In step 1211, the controller 14 determines whether or not the input block 42 becomes full by writing the write data. If the determination is negative (No in step 1211), the process for the write operation ends. If the determination is positive (Yes in step 1211), the process proceeds to step 1212. In step 1212, the controller 14 remaps the full input block 42 as an active block 43, by updating the BMT 46, and the process for the write operation on the side of the storage device 2 ends.

In step 1213, the OS 11 fetches the write completion notification from the completion queue 51. Then, in step 1214, the OS 11 updates the LUT 8 stored in the memory 5 of the host 3, so that mapping between Object ID or File ID of the write data and the physical address of the input block 42 are reflected therein.

In step 1215, the OS 11 determines whether each of the pages in which the write data have been written is an upper page or a lower page, based on the corresponding upper page write flag included in the write completion notification. For example, when the value of the upper page write flag is "0," the corresponding page data (i.e., a portion of the write data) are determined as written in a lower page, and when the value is "1," the corresponding page data are determined as written in an upper page.

If it is determined that the page data are written in an upper page ("Upper" in step 1215), the OS 11 erases the page data and page data that have been previously written in the lower page of the same physical sector and are still maintained in the WB 54, from the WB 54. Here, the OS 11 can identify the page data written in the lower page, based on the physical address of the upper page, which is included in the write completion notification. If it is determined that the page data are written in a lower page ("Lower" in step 1215), the OS 11 maintains the page data in the WB 54, because other page data will be subsequently written in the upper page thereof and the page data stored in the lower page may be lost in the meantime. Thereafter, the write operation ends.

In step 1218, since the write data are not successfully written in at least one page, the controller 14 remaps the input block 42 as a bad block 45, which triggers a data evacuation operation for data already stored in the input block 42. Also, the controller 14 remaps a free block 44 as a new input block for writing the write data. In step 1219, the controller 14 erases data in the new input block.

In step 1220, the controller 14 determines, for each unsuccessfully-written page, whether the unsuccessfully-written page is an upper page or a lower page, based on the physical address of the page. If the page is a lower page ("Lower" in step 1220), since there are no page data previously written in the same physical sector, the controller 14 attempts writing of the lower-page data into the new input block remapped in step 1218, by repeating step 1208 and the subsequent steps in the same manner. If the page is an upper page ("Upper" in step 1220), the process proceeds to step 1221. In step 1221, the controller 14 transmits, to the host 3, a notification of the failure of the upper page data writing and the physical address of the corresponding lower-page data for each unsuccessfully-written upper page.

In step 1222, the OS 11 receives the notification and recognizes that the data writing in the upper page was unsuccessful. Since lower-page data that have been previously written may be lost collaterally, then, the OS 11 and the controller 14 carries out data writing of both the upper-page data that are currently being written and the previously-written lower-page data in step 1223. The controller 14 carries out this data writing, by repeating step 1207 and the subsequent steps. That is, the controller 14 carries out data writing of the lower-page data by retrieving the lower-page data from the WB 54 through step 1207 and subsequent steps thereof, and also carries out data writing of the upper-page data, which may be maintained in the RAM 15 or retrieved from the WB 54 through step 1208 (as well as step 1207) and subsequent steps thereof.

According to this write operation, both the lower-page data and the upper-page data are written into an input block even if an error occurs during the data writing of the upper-page data.

[Copy Operation]

Figure 13:
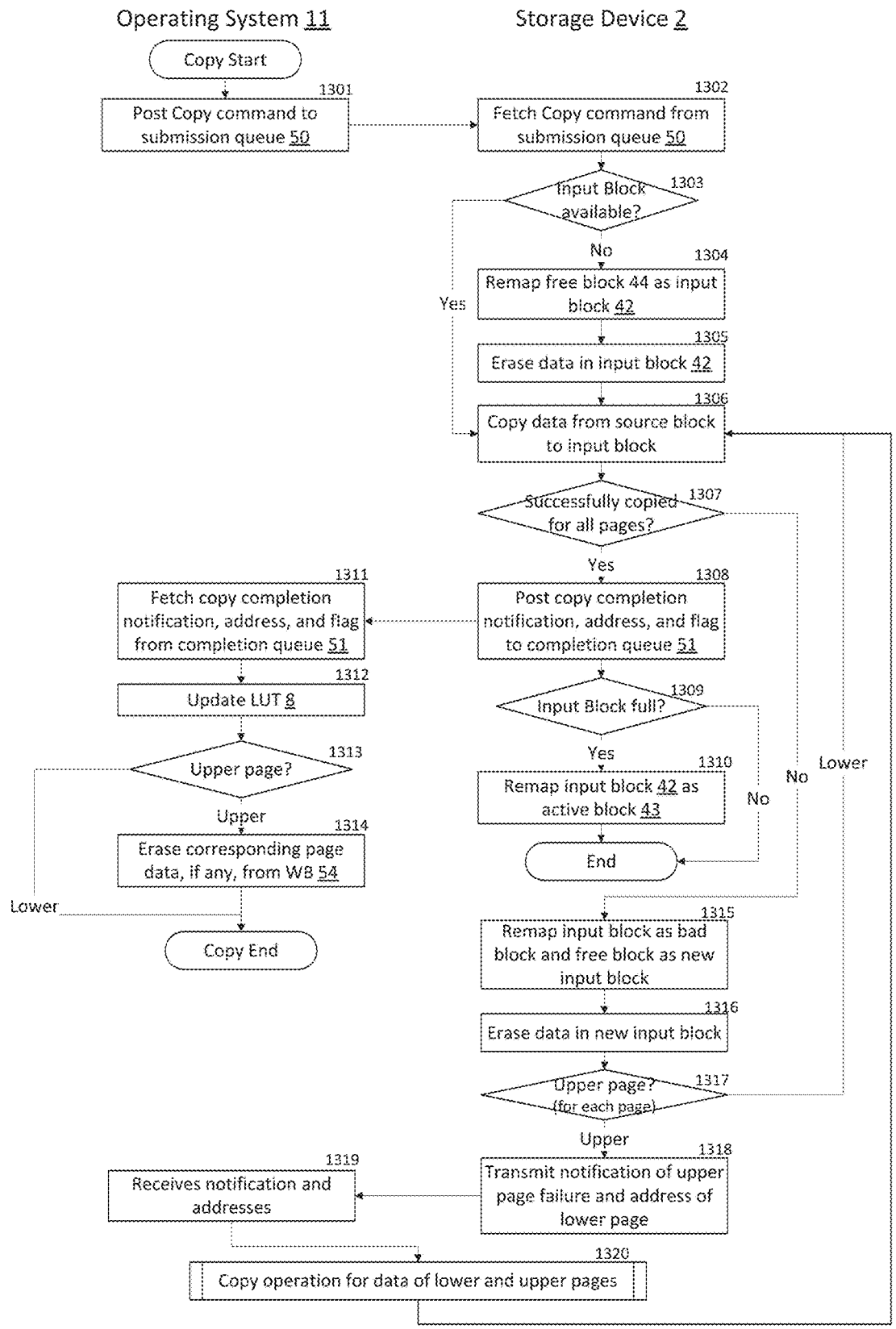
FIG. 13 illustrates a flow of a copy operation carried out according to an embodiment.
Figure 14:
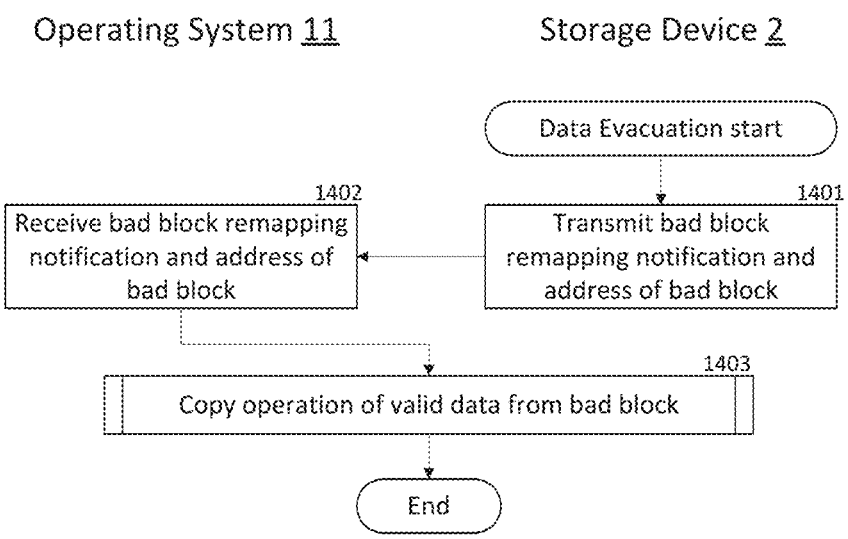
FIG. 14 illustrates a flow of a data evacuation operation carried out according to an embodiment.

FIG. 13 illustrates a flow of a copy operation carried out in the storage system 1. Through the copy operation, data stored in a physical address of the flash memory 16 are transferred to another physical address in the same physical block or another physical block. When the copy operation starts, in step 1301, the OS 11 of the host 3 posts a copy command, which includes a physical address from which data are to be copied (a source physical address), to the submission queue 50.

In step 1302, the controller 14 of the storage device 2 fetches the copy command from the submission queue 50. Thereafter, step 1303-1305 are carried out in a similar manner as steps 1204-1206. In step 1306, data are copied from the source physical address of a source block (e.g., an active block) to a physical address of the input block 42 page by page.

Then, in step 1307, the controller 14 determines whether or not the copy data are successfully written into the physical address of the input block 42, that is, whether or not data are written without any program error (write error), for each page. If the determination is positive for all pages (Yes in step 1307), the process proceeds to step 1308. If the determination is negative at least for one page (No in step 1307), the process proceeds to step 1315.

In step 1308, the controller 14 posts a copy completion notification, which includes the physical address into which the copy data are written and an upper page write flag for each page, in the completion queue 51 of the host 3.

Thereafter, steps 1311-1313 are carried out in a similar manner as steps 1213-1215.

If it is determined that page data are written in an upper page ("Upper" in step 1313), the OS 11 erases, from the WB 54, the page data and page data that have been previously written in the lower page of the same physical sector, if any, in step 1314. Here, the OS 11 can identify the page data written in the lower page, based on the physical address of the upper page, which is included in the copy completion notification. Thereafter, the copy operation ends. If it is determined that the page data are written in a lower page ("Lower" in step 1313), the copy operation ends.

Steps 1315-1320, which are carried out when the copy data are not successfully written at least for one page, are carried out in a manner similar to steps 1218-1223 of the write operation. However, in the copy operation, since the copy data are maintained in the source physical address, the unsuccessfully-copied page data are retrieved from the source block, instead of the WB 54.

According to the copy operation of the present embodiment, when copy data are not successfully copied to a page of an input block, and the controller 14 of the storage device 2 repeats the copy operation until the copy data successfully copied a page. Further, the page to which the copy data are unsuccessfully written is an upper page of the input block, the controller 14 also attempts to maintain data stored in the corresponding lower page by retrieving the data from the WB 54. According to this copy operation, data stored in the flash memory 16 can be more reliably maintained therein even after undergoing copy operations.

[Data Evacuation Operation]

The storage system 1 according to the present embodiment also carries out a data evacuation operation, which is an operation to copy valid data that are stored in an input block that was remapped as a bad block 45, to another block. As described above, during the write operation and the copy operation, if data writing or copying into at least one page of an input block 42 is unsuccessful, i.e., experiences a program error, the input block 42 is remapped as a bad block 45 (in steps 1218 and 1315). As such a bad block that has experienced the program error is more likely to experience a read error in the future and the possibility of the read error may increase as time passes, valid data in such a bad block are copied to another block through this data evaluation operation. Further, the bad block is not used for future writing operations and copy operations, because the controller 14 will not remap the bad block as an input block or the OS 11 that recognizes the bad block will not designate physical addresses of the bad block as a location of the write data, if the OS 11 can designate such a location. As a result, no new data are written in the bad block, which can reduce further programing errors that may occur in the bad block.

The data evacuation operation may be carried out as soon as the input block is remapped as the bad block during the write operation or the copy operation (i.e., right after the write operation or the copy operation). Alternatively, the data evacuation operation may be carried out as soon as all pending commands are completed or a predetermined time after thereof. Here, the valid data copied from the bad block may exclude data in the pages that experienced the program error (defective pages) and data in the lower pages of the detective pages, if any, because such data are taken care of in the write operation or the copy operation. In the example of FIG. 11C, the data corresponding to "0," "2," "3," and "5" through "8" are moved through the data evacuation operation (assuming that all of the data are valid), and the data corresponding to "1," "4," and "9" are excluded.

FIG. 13 illustrates a flow of a data evacuation operation carried out in the storage system 1. When the data evacuation operation starts, in step 1401, the controller 14 of the storage device 2 transmits a notification that an input block has been remapped as a bad block (bad block remapping notification) and physical addresses of the bad block to the host 3. In step 1402, the OS 11 of the host 3 specifies valid data stored in the bad block by referring to the LUT 9 and based on the physical addresses received from the storage device 2. In step 1403, the OS 11 copies the valid data in the bad block to another block by carrying out a copy operation in a manner similar to the steps of the copy operation illustrated in FIG. 13. Through the copy operation, the OS 11 updates the LUT 8 such that the object ID (or file ID) of the valid data are mapped to the physical address of the block to which the valid data are copied.

[Garbage Collection Operation]

The storage system 1 according to the present embodiment also carries out a garbage collection operation, which is an operation to copy valid data stored in a target physical block (e.g., active block 43 or input block 42), invalidate all data in the target physical block, and remaps the target block as a free block for future use. Through the garbage collection operation, a number of free blocks that can be remapped as an input block for future data writing is increased, and, as a result, latency of the storage device 2 can be maintained small. Further, during the garbage collection according to the present embodiment, all valid data in the target block are maintained as valid (not invalidated) until the OS 11 determines that all upper pages of physical sectors (in the input block) to which the valid data in the target block are copied becomes a written state. That is, if some upper pages of the physical sectors (in the input block) remain unwritten after the data copy through the garbage collection operation, the OS 11 does not operate to invalidate the valid data in the target block until data are written in those unwritten upper pages through a write operation or a copy operation subsequently carried out. As the OS 11 receives a completion notice and physical addresses in which data are written when each of a write operation and a copy operation is successfully carried out, the OS 11 can do the determination. On the other hand, if all upper pages of the physical sectors become the written state through the data transfer of the garbage collection, the OS 11 invalidates the valid data in the target block immediately after the data transfer. According to this garbage collection operation, valid data in the target block are more reliably copied to other blocks.

Figure 15:
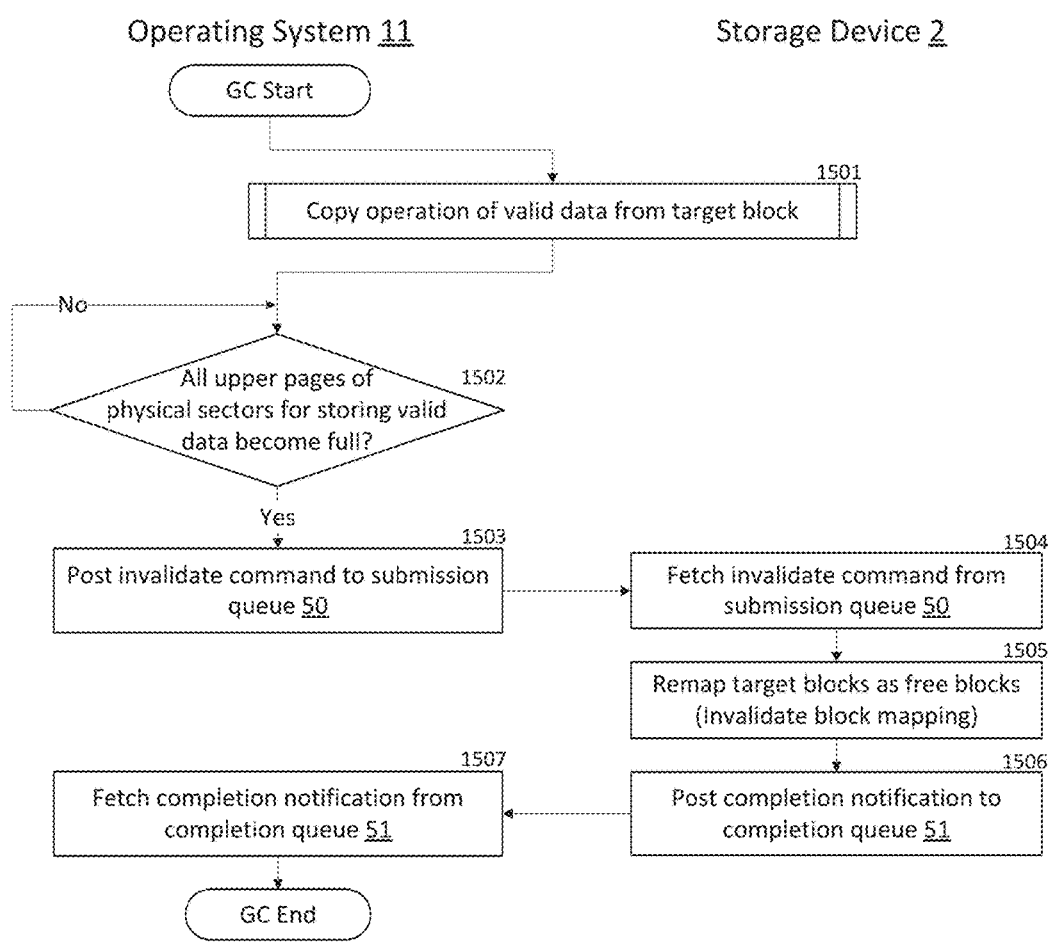
FIG. 15 illustrates a flow of a garbage collection operation carried out according to an embodiment.

FIG. 15 illustrates a flow of a garbage collection operation carried out in the storage system 1. When the garbage collection operation starts, in step 1501, the storage system 1, i.e., the OS 11 of the host 3 and the controller 14 of the storage device 2 operate to copy valid data in a target block to an input block in a manner similar to steps 1301-1312 and 1315-1320 of the copy operation shown in FIG. 13. Specifically, the OS 11 designates physical addresses of the target block from which valid data are to be copied in a copy command in a manner similar to step 1301. Also, the OS 11 updates the LUT 8 based on physical addresses posted in the completion queue 51 in a manner similar to step 1312.

In step 1502, the OS 11 determines whether or not all pages of physical sectors (in the input block) to which the valid data in the target block are transferred become the written state. Step 1502 is repeatedly carried out, e.g., at a predetermined time interval, until the determination result becomes positive. If the determination result becomes positive (Yes in step 1502), the process proceeds to step 1503. In step 1503, the OS 11 unmaps (deletes) mapping from a file ID or an object ID of data to be invalidated to its corresponding physical addresses of the target block, by updating the LUT 8. Also, the OS 11 posts an invalidate command, which includes the physical addresses corresponding the target block, to the submission queue 50.

In step 1504, the controller 14 of the storage device 2 fetches the invalidate command from the submission queue 50. Then, in step 1505, the controller 14 remaps the target block as a free block by updating the BMT 56. By remapping of the target block as a free block, data therein are invalidated.

In step 1506, the controller 14 transmits an invalidate completion notification to the host 3, so that the invalidate completion notification is posted on the completion queue 51 of the host 3. In step 1507, the OS 11 fetches the invalidate completion notification from the completion queue 51, and the process of the garbage collection operation ends.

As the foregoing illustrates, according to the above embodiment, when a write operation is carried out, the WB 54 of the host 3 maintains data, in particular, lower-page data, at least until corresponding upper-page data are successfully written in the flash memory 16. According to this write operation, more reliable data storage can be performed.

According to the above embodiment, when data are copied to an upper page of an input block during a copy operation and if data stored in the corresponding lower page are still maintained in the WB 54, the data in the WB 54 are erased. According to this write operation, the remaining capacity of the WB 54 may be increased for future write operations.

According to the above embodiment, the block that experienced the programing error is remapped as a bad block during the write operation or the copy operation, and through a data evacuation operation, valid data in the bad block are transferred to another block. According to this operation, further more reliable data storage can be performed.

According to the above embodiment, the valid data that are being transferred from a target block of a garbage collection operation to another block are maintained in the target block, until all upper pages of physical sectors to which the valid data are transferred become a written state. According to this garbage collection operation, more reliable data storage can be performed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage system, comprising:
   a host configured to transmit a write command and store write data in a buffer thereof; and
   a storage device including:
   a nonvolatile memory including a plurality of blocks, each of the blocks including a plurality of sectors and each of the sectors being logically divided into at least a lower page and an upper page for data storage, and
   a controller configured carry out a write operation to write the write data in the nonvolatile memory in response to the write command, and return a notice to the host acknowledging that the write operation is successful, wherein
   when a portion of the write data are written in a lower page of a sector of a block and an upper page of the sector remains unwritten after the write operation, the host maintains the portion of the write data in the buffer even after receiving the notice.

2. The storage system according to claim 1, wherein when data writing in the upper page of the sector is successfully carried out in a subsequent operation, the host erases the portion of the write data from the buffer.

3. The storage system according to claim 1, wherein the subsequent operation is a write operation to write data received from the host into the upper page of the sector.

4. The storage system according to claim 1, wherein the subsequent operation is a copy operation to copy data stored in another page to the upper page of the sector.

5. The storage system according to claim 1, wherein the write data further include a second portion that has been written in a lower page of a second sector of which upper page becomes a written state through the write operation, and
   the host is further configured to erase the second portion of the write data from the buffer in response to the notice.

6. The storage system according to claim 1, wherein when data writing to write a second portion of the write data in a lower page of a second sector is unsuccessful through the write operation, the controller is further configured to carry out another write operation to write the second portion of the write data in another block.

7. The storage system according to claim 1, wherein
when data writing to write a second portion of the write data in an upper page of a second sector is unsuccessful through the write operation, the controller is further configured to retrieve data corresponding to a lower page of the second sector from the buffer and write the retrieved data in another block.

8. The storage system according to claim 1, wherein
the controller selects the block and sectors thereof in which the write data are to be written, based on its own determination.

9. The storage system according to claim 1, wherein
the host instructs the controller of the block and sectors thereof in which the write data are to be written through the write command.

10. The storage system according to claim 1, wherein
each of the sectors logically includes also a middle page, and
when a second portion of the write data are written in a middle page of a second sector and an upper page of the second sector remains unwritten after the write operation, the host maintains the second portion of the write data in the buffer even after receiving the notice.

* * * * *